(12) United States Patent
Camillus et al.

(10) Patent No.: US 6,172,735 B1
(45) Date of Patent: *Jan. 9, 2001

(54) METHOD FOR PRINTING IMAGES USING A FILM PACK HAVING A PERFORATED FLAP

(75) Inventors: Joseph C. Camillus, Dayton, OH (US); Morihiko Yamada, Nagano-Ken (JP)

(73) Assignee: Cycolor, Inc., Miamisburg, OH (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/891,356

(22) Filed: Jul. 10, 1997

Related U.S. Application Data

(60) Provisional application No. 60/021,537, filed on Jul. 11, 1996.

(51) Int. Cl.[7] ............ G03B 29/00; G03B 27/58; G03B 17/50
(52) U.S. Cl. ............... 355/28; 355/72; 396/34
(58) Field of Search .......... 355/72, 28; 271/121, 271/145; 396/598, 518, 527, 34

(56) References Cited

U.S. PATENT DOCUMENTS

| | | | |
|---|---|---|---|
| 2,310,371 | 2/1943 | Lines et al. | 229/85 |
| 3,618,752 | 11/1971 | Barker et al. | 206/57 |
| 3,968,926 | 7/1976 | Smolderen et al. | 229/66 |
| 3,986,609 | 10/1976 | Marsh et al. | 206/455 |
| 4,058,823 | 11/1977 | Mitchell et al. | 354/354 |
| 4,571,140 | 2/1986 | Yamada et al. | 414/412 |
| 4,720,011 | 1/1988 | Canamero | 206/455 |
| 4,727,391 | 2/1988 | Tajima et al. | 354/277 |
| 4,821,876 | 4/1989 | Naito et al. | 242/71.1 |
| 4,860,042 | 8/1989 | Tajima et al. | 354/277 |
| 5,008,694 | 4/1991 | Tajima et al. | 354/277 |
| 5,019,848 | 5/1991 | Koelsch et al. | 354/277 |
| 5,019,849 | 5/1991 | Harrison | 354/308 |
| 5,048,686 | 9/1991 | Kausch et al. | 206/455 |
| 5,055,869 | 10/1991 | DiPietro | 354/276 |
| 5,130,731 | 7/1992 | Larsen et al. | 354/276 |
| 5,156,331 | 10/1992 | Pirre | 229/223 |
| 5,178,278 | 1/1993 | Oliverius | 206/455 |
| 5,251,755 | 10/1993 | Kausch | 206/455 |
| 5,295,578 | 3/1994 | Neidospial, Jr. et al. | 206/408 |
| 5,377,835 | 1/1995 | Cornelissen et al. | 206/455 |
| 5,477,310 | 12/1995 | Lamb, Jr. et al. | 355/72 |
| 5,501,415 | 3/1996 | Harris et al. | 242/596.7 |
| 5,879,003 | * 3/1999 | Kovach et al. | 271/121 |

FOREIGN PATENT DOCUMENTS

| | | |
|---|---|---|
| 546332 | 9/1956 | (BE) . |
| 539931A1 | 5/1993 | (EP) . |
| 1123254 | 9/1956 | (FR) . |
| 873882 | 8/1961 | (GB) . |
| 3212375 | 9/1991 | (JP) . |
| WO921504 | 9/1992 | (WO) . |

* cited by examiner

*Primary Examiner*—Russell Adams
*Assistant Examiner*—Peter B. Kim
(74) *Attorney, Agent, or Firm*—Thompson Hine & Flory LLP

(57) ABSTRACT

A method for printing photographic quality images downloaded to a printer comprising; providing a light-tight film pack containing photosensitive imaging media, the film pack having a severable line of on a face thereof which defines a flap, the flap providing access to the media when the flap is opened; providing a cartridge of a size and shape to fit into a cartridge-access opening in the printer, the cartridge comprising a tray for accepting the film pack; inserting the film pack into the cartridge; inserting the cartridge containing the film pack into the cartridge-access opening in the printer; severing the film pack along the severable line to free the flap; opening the flap to access the media; advancing the media into the printer; and exposing and developing the media to provide a photographic quality print.

22 Claims, 3 Drawing Sheets

METHOD FOR PRINTING IMAGES USING A FILM PACK HAVING A PERFORATED FLAP

This application claims priority from U.S. Provisional Application No. 60/021,537, filed Jul. 11, 1996.

BACKGROUND OF THE INVENTION

The present invention relates to a method for printing images on a photosensitive media utilizing a printer wherein the media is contained in a light-tight film pack. The film pack includes a perforated flap which allows the film pack to be easily opened within the printer to provide access to the media.

Digital imaging applications in which photographic quality images can be downloaded to a printer and reproduced are becoming increasingly popular. For instance, Kodak Corporation provides a service in which films and negatives can be placed on photo CD discs and photo CD access software allows the user to load the images into the personal computer memory, view the images, edit the displayed image by cropping or changing the size, color settings and orientation, and copy the original or edited image as a bitmap. In addition, electronic digital cameras are commercially available which photograph an image and store it in a digital memory, such as a random access memory instead of on film. Then these stored images can be downloaded from the camera to a personal computer for viewing and editing in a manner analogous to the photo CD images discussed above. Still another application, personal computers are now available with television cards. With a TV card, the user can download images directly from the television network or from a video recorder for viewing and editing.

A printer having capabilities for printing images downloaded from a video or personal computer and which fits within a personal computer is described in commonly assigned copending U.S. application Ser. No. 08/470,921 filed Jun. 6, 1995 corresponding to International Publication No. WO96/39301. Such a printer is housed in the accessible disc drive bay. The printer includes a print head, access opening for a media supply cartridge, a communication port for receiving print signals and image information, and a media conveyor for transporting the media through the printer and dispensing or ejecting the media from the printer. Preferably, the printer also includes a developer such as a pressure head or pressure roller or a means to heat the media.

SUMMARY OF THE INVENTION

The present invention is a method for printing photographic quality images downloaded to a printer, the method comprising:

providing a light-tight film pack containing photosensitive imaging media, the film pack having a severable line on a face thereof which defines a flap, the flap providing access to the media when the flap is opened;
providing a cartridge of a size and shape to fit into a cartridge-access opening in the printer, the cartridge comprising a tray for accepting the film pack;
inserting the film pack into the cartridge;
inserting the cartridge containing the film pack into the cartridge-access opening in the printer;
severing the film pack along the severable line to free the flap;
opening the flap to access the media;
advancing the media into said printer; and
exposing and developing the media to provide a photographic quality print.

The film used in the printer is stored in a film pack to prevent extraneous light from inadvertently exposing the film. The film pack is sealed and includes a severable line in the shape of a flap at one end of the film pack. The film pack is placed in a media cartridge which is inserted into the printer. The printer includes a means such as a pick up wheel for separating the flap from the film pack along the severable line in order to open the film pack and expose the film.

The film pack useful in carrying out the present invention comprises a first face and a second face located in generally parallel planes, wherein the two faces are sealed together along at least one and preferably two of their peripheral edges to form a light-tight cavity within the film pack. The two faces of the film pack are preferably sealed together along the peripheral edges which define the two sides of the film pack or the two ends of the film pack. The film pack further comprises a flap at one end of the film pack which can be easily opened along a severable line to provide access to photosensitive media contained inside the sealed film pack. The film pack is inserted into a cartridge which comprises a tray for accepting the film pack, and a cover having a media access opening. The cover can be a separate unit which securely fits the top of the tray or it can be an integral part of the tray provided that the opening in the cover is sufficiently large enough to permit the film pack to be inserted through the hole and into the tray. In accordance with the invention, the film pack is designed with a severable line extending laterally across a face of the film pack and toward the end of the film pack to form the outline of a flap. The severable line allow the flap to be easily severed and opened after the assembly has been inserted into the printer, thereby preventing any exposure of the media to extraneous light.

BRIEF DESCRIPTION OF THE DRAWINGS

The invention will now be described by way of example and with reference to the accompanying drawings, in which.

DETAILED DESCRIPTION OF THE PREFERRED EMBODIMENT

In a typical embodiment of the present invention, a light-tight film pack is provided for supplying a plurality of sheets of photosensitive material. The film pack contains a severable line which defines the size and shape of a flap at one end of the film pack so that the film pack is easily opened once inside the printer. Therefore, since the film pack is mechanically opened while inside the printer, it need not be opened by hand and the photosensitive material is not exposed to any damaging extraneous light.

This system will now be described in detail below with respect to a printer apparatus such as a laser printer. However, it is to be understood that the forgoing general description and the following detailed description are exemplary and explanatory but are not intended to be restrictive of the invention. For example, the film pack can be used in printers such as a video printer or other type of printer, facsimile machine, cameras or copiers which employ photosensitive media.

Figure 1:
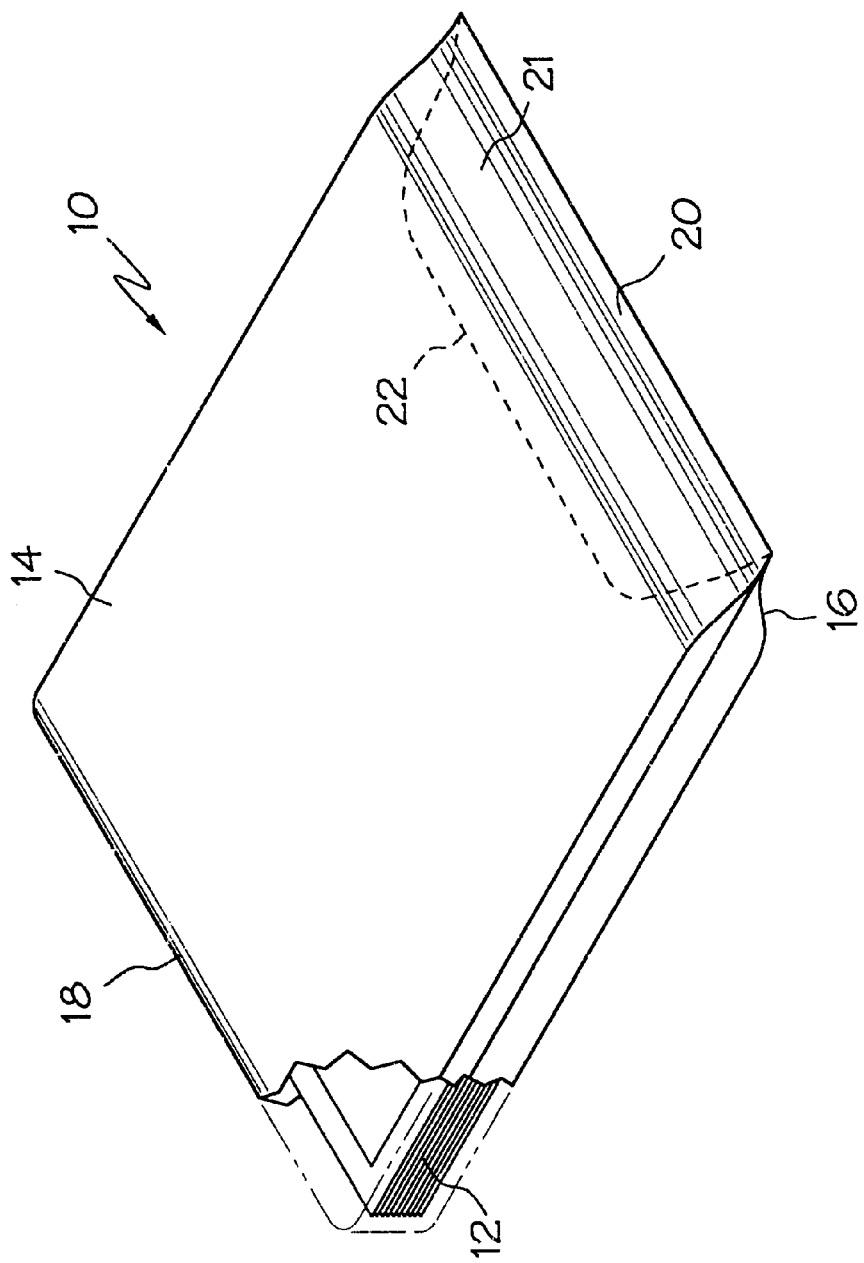
FIG. 1 is a perspective view of a film pack of the present invention containing film media.

As shown in FIG. 1, a film pack 10 is provided for housing photosensitive imaging film material or media 12. The film pack 10 is light-tight and may be made of paper or a plastic material which is opaque. The material may contain an additive such as a pigment or dye, typically of a dark color such as black to block the transmission of light through the material. The film pack is of a size and shape to hold a stack of imaging film 12 and also fit in a media cartridge of the printer as will be described herein below. The film pack includes a first face 14, a second face 16 located in generally parallel planes. The first and second faces are sealed together along at least one and preferably two of their peripheral edges 18 and 20. The film pack further includes a severable line 22 which traverses at least one face of the film pack to form a flap 21. The severable line preferably traverses the entire face of the film pack and extends to one end of the film pack so that the flap 21 can be easily separated from the rest of the film pack. In one aspect of the invention the severable line typically comprises a plurality of perforations such as holes, slits, or the like provided that such perforations are sufficiently small enough to prevent the photo-sensitive media from being exposed to extraneous light. In another aspect of the invention the severable line comprises a continuous or discontinuous scored line wherein the scored line does not extend completely through the film pack material. If desired, the scored line may contain a plurality of perforations to further facilitate the separation of the flap from the rest of the film pack. Although only one severable line is shown, it may be advantageous to provide more than one severable line in the face of the film pack. Or, as an alternative, the severable line may be provided in more than one face of the film pack. When opened along the severable line 22, the flap 21 is peeled back inside the printer permitting the media to be easily accessed by the printer.

Figure 2:
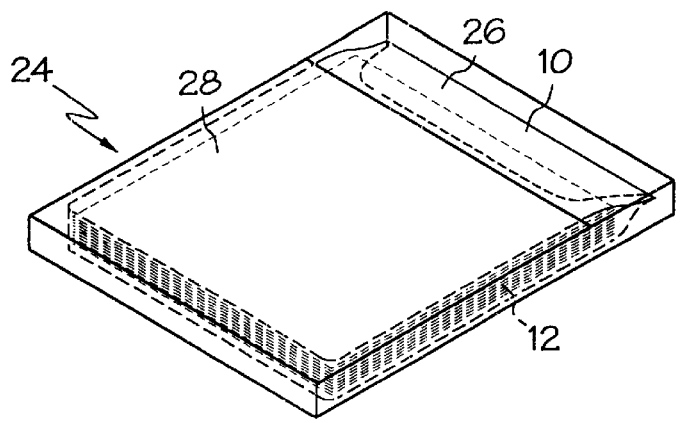
FIG. 2 is the film pack of FIG. 1 inserted into a media cartridge.

The film pack 10 of the present invention may be used as follows: The sealed film pack 10 is inserted into a media cartridge 24 as shown in FIG. 2. The media cartridge is designed to supply the media in the form of individual sheets, but the media could easily be supplied in roll form. If the media is in roll form, it is preferred that the apparatus include a cutting means such as a slitter for separating the prints from the roll before they are dispensed from the printer. The media 12 supplied by cartridge 24, can be any media used in imaging devices such as those previously described.

The media cartridge 24 is generally rectangular in shape and is made of a material which is capable of blocking light from the media 12 inside. The cartridge has an opening 26 of a size to receive the film pack and is shaped to fit in an opening in the printer. The cartridge 24 further includes a top 28 which fits securely over the media cartridge. The top 28 typically does not extend the entire length of the cartridge 24, therefore an opening 26 is created to provide access to the film pack 10. For example, an opening length of about 20% of the cartridge has been found suitable. As discussed above, the top may be of a size to entirely cover the top of the cartridge wherein the top has an appropriately sized hole therein. The top 28 must fit the cartridge 24 so that no extraneous light can penetrate into the cartridge, except through the opening 26.

Figure 3:
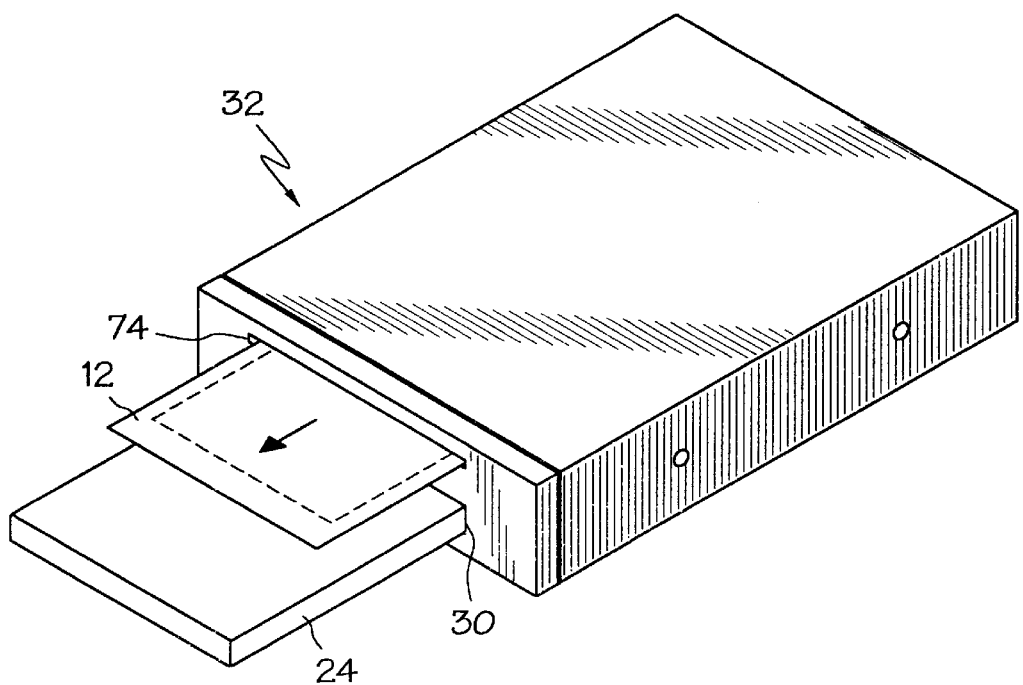
FIG. 3 is a perspective view of an exemplary printing apparatus which employs the film pack of the present invention.

The media cartridge 24 is inserted into an opening slot 30 in a printer 32 as shown in FIG. 3. The media cartridge need not be inserted entirely into the printer. It only need be inserted to a point that the opening 26 is completely inside the printer.

Figure 4:
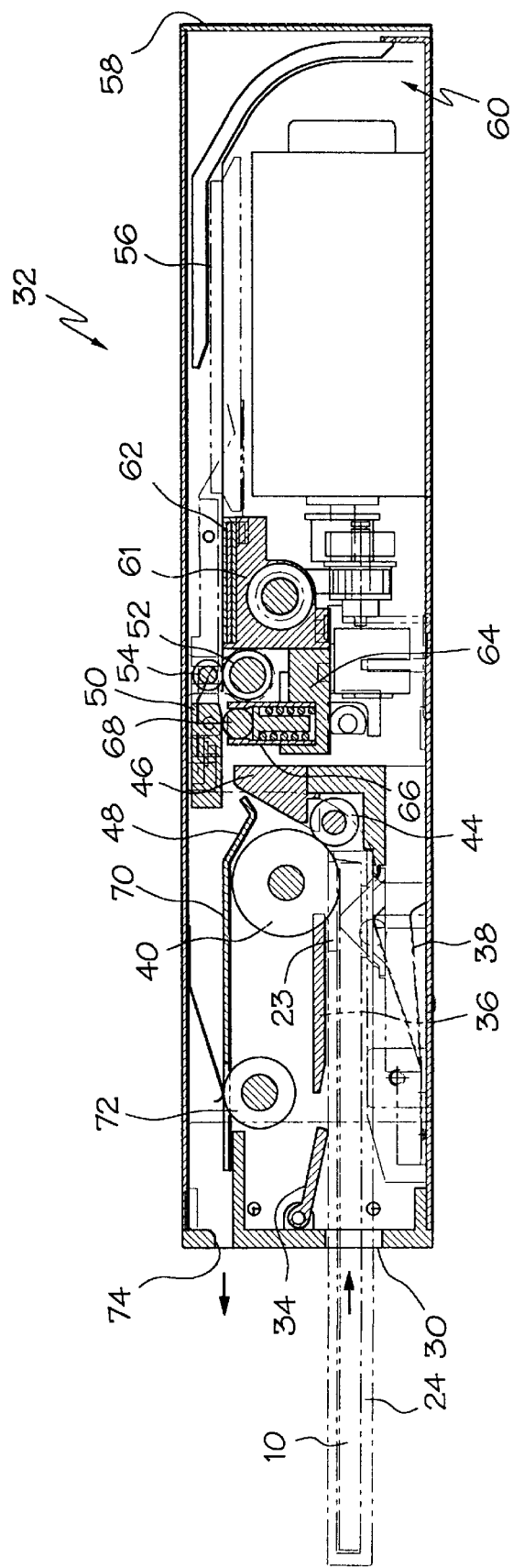
FIG. 4 is a cross-sectional view of the printer of FIG. 3.

By inserting the media cartridge 24 into the slot 30, door panel 34 is rotated to an open position as shown in FIG. 4. The cartridge 24 is positioned in the printer 32 with the aid of a guide plate 36 and a spring element 38 which urges the cartridge into alignment with guide plate 36. The cartridge is situated so that the sealed film pack 10 is held in contact with a pick up roller 40 having a friction surface.

With the cartridge 24 in place in the printer, the pick up roller 40 rotates when the printer receives a print signal from a computer. The pickup roller 40 may be driven by any means typically employed to drive such rollers. For example, the pickup roller may be driven by a gear train (not shown). During its rotation, the pickup roller 40 "grabs" the film pack 10 adjacent the severable line 22 and tears it along the severable line 22, forming an opened flap (not shown). The roller 40 then pushes the flap back, away from the remainder of the face 14 of the film pack 10 to access the media 12 (shown and described herein, for purposes of illustration, as individual sheets of media). With continued rotation of the roller 40, the first sheet of media 12 is advanced by roller 40 into the nip between the roller 40 and a roller 44. Roller 44 is designed to provide a slight rotational drag on the media. In this way if two or more sheets of media 12 are fed at the same time, roller 44 will scrape the additional sheets from the back side of the intended sheet to assist in preventing double feeding. With continued rotation of roller 40, the top media sheet is removed from the media cartridge 24 and moved upwardly along a ramp 46 where it is directed by a baffle 48 and support plate 50 into the nip between line feed roller 52 and idle roller 54.

Rollers 40 and 52 are driven by a motor (not shown) which is conveniently but not necessarily a step motor via the gear train. The media continues to be advanced via rollers or other conveying means such as belt conveyors to the guide plate 56 at the back 58 of the printer 32. The guide plate 56 is curved to direct the leading edge of the media sheet into the open space 60. When the sheet of film reaches this predefined position, the motor reverses. The sheet is then exposed by print head 61, exposure head 62 and developer head 64. The developer head 64 may include a pressure applicator 66 including one or more ball elements 68.

Examples of photosensitive media which can be packaged in a film pack and processed in a printer according to this invention include photographic film, the diffusion transfer color photographic or "instant" film pack (POLAROID film unit), or a film pack employing photohardenable microcapsules such as the CYCOLOR media developed by The Mead Corporation.

The printer 32 is programmed such that the media continues to be advanced, exposed, and developed until the image is complete. Upon completion of the image, the print head 60 is positioned to the side of the printer, the pressure head is disabled and the media is advanced along a surface 70 to roller 72. Roller 72 is driven by a gear train and advances the media out of an exit slot 74. Once the print 12 has been ejected through slot 74, the motor is reversed and upon receiving the next print signal, the printer is ready to remove another sheet of media from the media cartridge 24 and to repeat the printing operation.

The apparatus may optionally include means to keep the top sheet of film always easily accessible to the roller 40. Accordingly, the cartridge 24 may include a spring which sits in the bottom of the tray to urge the film sheets upwards as the top sheet is removed. Or, the roller 40 may be adapted with a pivot so that it pivots downward to reach the film 12 in the bottom of the cartridge 24.

The invention has been described above in a specific type of printer. However, the film pack may be used with other types of printers as well as copiers, cameras, facsimile machines, and various other types of imaging equipment employing photosensitive media. The design of the printer and the selection of the media and the print head can vary depending on the type of image the printer is designed to reproduce and the resolution and color quality desired in the image. For printing text, a thermal print head or an ink jet print head may be used. The film pack may further be used with or without the use of a media carriage.

Having described the invention in detail and by reference to preferred embodiments thereof, it will be apparent that modifications and variations are possible without departing from the scope of the invention defined in the appended claims.

What is claimed is:

1. A method for printing photographic quality images downloaded to a printer comprising:

providing a light-tight film pack containing photosensitive imaging media, said film pack having a severable line on a face thereof which defines a flap, said flap providing access to said media when said flap is opened;

providing a cartridge of a size and shape to fit into a cartridge-access opening in the printer, said cartridge comprising a tray for accepting said film pack;

inserting said film pack into said cartridge;

inserting said cartridge containing said film pack into said cartridge-access opening in said printer, wherein film pack is automatically severed along said severable line to free said flap and provide access to said media;

opening said flap to access said media;

advancing said media into said printer; and exposing and developing said media to provide a photographic quality print;

wherein said printer includes a pick up roller and said step of inserting said cartridge containing said film pack into said cartridge-access opening in said printer includes the steps of contacting said flap adjacent said severable line with said pick up roller and rotating said roller to sever said severable line, and said step of opening said flap includes the steps of rotating said pickup roller in contact with said flap and displacing said flap from the face of said film pack; and wherein said step of advancing said media includes the steps of contacting the media underlying the displaced flap with said pick up roller and rotating said roller to advance said media.

2. The method of claim 1 wherein said light-tight film pack comprises a first face and a second face located in generally parallel planes said first and said second faces being sealed along at least one of their peripheral edges.

3. The method of claim 2 wherein said first face is sealed to said second face along two parallel edges of said first face and said second face, said sealed edges defining sides of said film pack or ends of said film pack.

4. The method of claim 1 wherein said media is in the form of individual sheets or a roll of continuous film.

5. The method of claim 4 wherein said media is in the form of individual sheets.

6. The method of claim 1 wherein said cartridge comprises a tray for accepting said film pack and a top which provides a media access opening.

7. The method of claim 1 wherein said severable line comprises a plurality of perforations.

8. The method of claim 1 wherein said severable line comprises a scored line.

9. The method of claim 8 wherein said scored line is a continuous line.

10. The method of claim 8 wherein said scored line is a discontinuous scored line.

11. The method of claim 8 wherein said scored line further comprises a plurality of perforations.

12. The method of claim 1 wherein said film pack comprises a material capable of blocking the transmission of light through said material.

13. The method of claim 12 wherein said material is paper or plastic.

14. A method for printing photographic quality images downloaded to a printer comprising:

providing a substantially light-tight film pack containing photosensitive imaging media, said film pack having a severable line on a face thereof, said severable line defining a flap, and when said flap is severed along said severable line and displaced from said face of said film pack, said flap providing an opening into said film pack for accessing said media contained in said film pack;

inserting said film pack into said printer;

contacting said flap substantially adjacent to said severable line by a pick up roller positioned in said printer;

rotating said pick up roller to displace said flap from said face of said film pack, thereby providing said opening into said film pack;

contacting said media contained in said film pack through said opening by said pick up roller; and rotating said pick up roller to advance said media from said film pack into said printer.

15. The method of claim 14, wherein said step of rotating said pick up roller to displace said flap from said face of said film pack also includes a step of severing said film pack along said severable line by rotating said pick up roller to displace said flap from said face of said film pack.

16. The method of claim 14, wherein said step of inserting said film pack into said printer includes the steps of:

providing a cartridge including a tray for accepting said film pack;

inserting said film pack into said cartridge; and inserting said cartridge containing said film pack into said printer.

17. The method of claim 16, wherein said printer includes a cartridge-access opening and said step of inserting said cartridge containing said film pack into said printer includes a step of inserting said cartridge containing said film pack through said cartridge-access opening.

18. The method of claim 14 wherein said severable line includes a plurality of perforations distributed therealong.

19. The method of claim 14 wherein said severable line includes a plurality of scores distributed therealong.

20. A method for printing photographic quality images downloaded to a printer comprising:

(a) providing a substantially light-tight film pack containing photosensitive imaging media, said film pack having a severable line on a face thereof, said severable line defining a flap, and when said flap is severed along said severable line and displaced from said face of said film pack, said flap providing an opening into said film pack for accessing said media contained in said film pack;

(b) inserting said film pack into said printer;

(c) contacting said flap substantially adjacent to said severable line by a pick up roller positioned in said printer;

(d) rotating said pick up roller to displace said flap from said face of said film pack, thereby providing said opening into said film pack;

(e) contacting a first one of said media contained in said film pack through said opening by said pick up roller;

(f) rotating said pick up roller to advance said first media from said film pack into said printer;

(g) contacting a next one of said media contained in said film pack through said opening by said pick up roller;

(h) rotating said pick up roller to advance said next media from said film pack into said printer.

21. The method of claim 20, wherein steps (g) and (h) are repeated until all of said media has been advanced from said film pack.

22. The method of claim 21, wherein step (d) also includes a step of severing said film pack along said severable line by rotating said pick up roller to displace said flap from said face of said film pack.

* * * * *